3,336,112
CATALYTIC PRODUCTION OF HYDROGEN PEROXIDE FROM ITS ELEMENTS

George Wallace Hooper, Norton-on-Tees, England, assignor to Imperial Chemical Industries Limited, London, England, a corporation of Great Britain
No Drawing. Filed July 2, 1964, Ser. No. 380,078
Claims priority, application Great Britain, July 23, 1963, 29,126/63
13 Claims. (Cl. 23—207)

This invention relates to a process for producing hydrogen peroxide.

According to the invention there is provided a process for producing hydrogen peroxide which comprises contacting hydrogen and oxygen with a solid catalyst in the liquid phase in the presence of water and a hydrogen peroxide stabiliser, for example, a sequestrative hydrogen peroxide stabiliser.

By "hydrogen peroxide stabiliser" is meant a compound which inactivates substances which tend to catalyse the decomposition of hydrogen peroxide. It is believed that such inactivation is often due to sequestration of catalytic ions, but the invention is not limited to the use of any particular type of stabiliser: some however are clearly superior to others. Many sequestrative stabilisers are known, for example, aluminates, silicates, titanates, stannates, antimonates, which may be in the form of solutions or colloidal dispersions; salts of oxy-acids of phosphorus especially condensed phosphates; phenolic compounds such as thymol; chelating compounds for example salicylates, citrates, hydroxyquinolines, carboxypyridines, carboxyquinolines, hexamethylenetetramine, nitriloacetic acids, α-amino-carboxylic acids; and other organic compounds such as acetanilide, phenacetin, benzoic acid, glycerol phenyl ether, thio-urea, uric acid and glycol monoacetate. Furthermore colloids such as gum arabic, gum tragacanth, albumin, gelatine, agar and phosphatides may be used, and also cation-exchange resins.

It is preferred that the stabiliser should be soluble in the liquid phase in which the process is carried out: the process is however not limited to reaction mixtures in which the stabiliser is in solution but includes also reaction mixtures in which the stabiliser although soluble has come partly out of solution, for example by forming a compound with the metal of the catalyst or by adsorption on the walls of the reaction vessel.

The stabiliser is preferably polymeric: for this purpose polymeric includes dimeric. Polymers containing two or more acid phosphate groupings in the molecule, for example salts of acid phosphate esters of polyhydric alcohols, salts of polyphosphonic acids or more particularly salts of condensed phosphoric acids, for example having a polymerisation number up to about 14, conveniently pyrophosphoric acid or hexametaphosphoric acid, are very effective. The salts of condensed phosphoric acids appear to exert a specific activating effect also on the solid catalyst: in their presence palladium is desorbed from the support on which it is introduced and converted to a colloidal form in which it exerts a particularly high activity for the union of hydrogen with oxygen to give hydrogen peroxide. As a result, it is possible to obtain usefully high yields of hydrogen peroxide: thus for example a yield of 60% calculated on the hydrogen used has been obtained by the process of the invention using a gas mixture containing a 100% excess of oxygen.

The stabiliser concentration required is usually a trace concentration. Useful results are obtained when working in glass vessels if the vessel is merely washed out with a solution of the stabiliser and rinsed, before starting the process. In another procedure especially suitable for a continuous process a small quantity of the stabiliser is added to the reaction mixture after it has been placed in the reaction vessel or as it enters the reaction vessel. Both procedures may be used if desired. It is a matter of simple trial to choose a suitable stabiliser and concentration for a particular vessel construction material. As examples of concentrations of stabiliser suitable for use in a "Pyrex" (Registered Trademark) vessel there may be mentioned 20 to 200 parts per million by weight.

In this specification the stabilisers used are defined in terms of the form in which they are added: it will be understood that by reaction with other substances present they may be converted in the reaction mixture to some different form.

The process of the invention is preferably carried out on the acid side of neutrality. Preferably the acidity (that is, the hydrogen ion concentration) of the reaction mixture is at least $10^{-5}$ N, especially in the range $10^{-4}$ N to N: under these conditions the stabiliser if added as a salt will be converted to the free acid form. It is within the scope of the invention to treat the reaction vessel with one stabiliser, which may be in alkaline or neutral or acid solution and may be example be of a kind not usable in acid solution, and thereafter to carry out the process in the presence of an added stabiliser which is different from the one used to treat the reaction vessel.

The acid used is preferably at least as strong as acetic acid and more preferably has an inorganic acidic radical. Conveniently sulphuric or hydrochloric acid or a mixture of the two is used, but others, for example nitric acid, hydrofluoric acid, hydrobromic acid, phosphoric (that is, orthophosphoric) acid and sulphonic acids may be used.

There may also be present a second acid radical, that is, sulphate nitrate, fluoride, chloride, bromide, cyanide, cyanate, thiocyanate and phosphate and especially a halogen or pseudo-halogen acid radical from that list. The concentration of the second acid radical is especially in the range $10^{-4}$ N to 0.1 N. The second acid radical is preferably chloride. It may be added as the acid itself or as a salt.

The process of the invention is preferably carried out in the presence of an oxygen-containing organic compound, for example, an alcohol, aldehyde, ketone, ether, ester, amide, oxygen-containing amine or carboxylic acid. It is preferred to use one or more alcohols or ketones having a solubility in water of at least 1% by volume at room temperature, and especially to have present at least some oxygen-containing organic compound of a kind which is miscible with water at room temperature so that a one-phase mixture results. Acetone is highly effective and suitably forms by volume 30%–95% especially 40%–90%, for example 75%, of the liquid of the reaction mixture.

The solid catalysts to be used preferably contain as metallic component at least one element from Group I or Group VIII of the Periodic Table. Palladium is especially effective, and is preferably introduced on a support or as a palladium salt of an isopoly or heteropoly acid. A particularly suitable catalyst consists essentially of palladium supported on silica gel, especially 1 to 10% by weight of palladium supported on silica gel having a specific surface of 200–400 m.$^2$/g. The catalyst is used conveniently in the form of a finely divided solid maintained in suspension in the liquid reaction mixture, but other forms, such as pellets, over which the liquid reaction mixture is caused to flow, may be used.

In general the conditions under which the process is carried out may be the same as those described in the earlier above-mentioned co-pending application. Thus the hydrogen and oxygen may be used in dilution with unreactive gas if desired, for example, oxygen may be supplied as air. When operating the process it is preferable to avoid contact between hydrogen-oxygen mixtures and dry catalyst. The pressure and temperature at which the process is operated may vary over a wide range. Conveniently the process may be operated at atmospheric pressure (that is, one part hydrogen to five parts air, giving a partial pressure of 0.16 atmosphere of each gas) but hydrogen peroxide is produced at a higher concentration at superatmospheric pressure for example 3 atmospheres each of hydrogen and oxygen in admixture with 69 atmospheres of nitrogen as a diluent. Still higher pressures, for example 50 atmospheres each of oxygen and hydrogen, may be used if desired. Conveniently the process is operated at room temperature (say 20° C.), but hydrogen peroxide is produced in higher concentration if a lower temperature (for example in the range 0° C. to −20° C. or below) is employed.

As a result of the mild temperature conditions the process may be carried out in vessels made of or lined with a considerable variety of materials, for example glass (especially low-alkali borosilicate glass such as "Pyrex" (Registered Trademark)), plastics (especially polypropylene, nylon, polytetrafluoroethylene or polyethyleneterephthalate).

The solution of hydrogen peroxide produced by the process of the invention may be used for an oxidation process for example the oxidation of cyclohexane to cyclohexanol and cyclohexanone or of benzene to phenol or the hydroxylation of olefines. Alternatively it may be worked up by separating the solid catalyst and evaporating the resulting solution. This may be carried out without added reactants for example to give high concentration hydrogen peroxide or may be carried out in the presence of peroxide-forming substances for example urea or a borate for example sodium borate or a carbonate for example sodium carbonate.

The process may be conducted as a batch-wise or in a continuous process. Conveniently the continuous form of the process is conducted in one or more catalyst-packed towers.

The following Examples 1 to 5 illustrate the production of hydrogen peroxide by the process of the invention.

*Example 1*

A "Pyrex" (Registered Trademark) vessel was washed internally with a saturated aqueous solution of sodium pyrophosphate $Na_4P_2O_7$ then allowed to drain. Then 100 ml. of a solution of hydrochloric acid ($10^{-2}$ N) and sulphuric acid ($10^{-1}$ N) in a mixture of acetone 75% and water 25% (by volume) was placed in it and 1 g. of finely divided palladium 5% on silica-gel catalyst was added. The mixture was then vigorously stirred for five hours, during which time it was kept at 0° C. and a mixture of hydrogen (1 part) and air (4 parts) at atmospheric pressure was passed in at the rate of 25 litres per hour. In this time 2.85 g. of hydrogen peroxide were produced.

In a run in a similar vessel not treated with sodium pyrophosphate but otherwise under the same conditions, only 0.83 g. of hydrogen peroxide was produced.

*Example 2*

The process of Example 1 was repeated except that the gas mixture consisted of hydrogen (one part) and oxygen (five parts) and that to the reaction mixture was added 100 p.p.m. by weight of sodium pyrophosphate. After five hours' operation 2.93 g. of hydrogen peroxide were present.

*Example 3*

The process of Example 2 was repeated except that sodium hexametaphosphate (purchased under the Registered Trademark "Calgon") was added to the reaction mixture to give a concentration of 100 p.p.m. by weight. After five hours' operation 2.69 g. of hydrogen peroxide were present.

*Example 4*

The process of Example 1 was repeated in a specially designed reaction vessel having a low "dead-volume" using other stabilisers and with the modification that for each run the reaction vessel was not rinsed with any stabiliser. The results are shown in the table:

TABLE 1

| Stabiliser | Concentration, p.p.m., w./w. | Weight of hydrogen peroxide produced in 2 hours, gms. |
|---|---|---|
| None | | 0.90 |
| Sodium hexametaphosphate | 100 | 2.21 |
| 1:2-diamino-cyclohexane tetracarboxylic acid | 100 | 1.15 |
| Agar | 100 | 1.30 |

*Example 5*

Three runs of modifications of the process of Example 4 were carried out with sodium hexametaphosphate as the stabiliser: the stabiliser was added to give 100 p.p.m. in the reaction mixture. The modifications were that in run (a) the acetone was replaced by water and (b) the concentration of sulphuric acid was $10^{-1}$ N but no hydrochloric acid was present. The results were as shown in Table 2.

TABLE 2

| Run | Conditions as in Example 1 except— | Weight of hydrogen peroxide produced in 2 hours' operation, gm. |
|---|---|---|
| (a) | Acetone replaced by water | 0.22 |
| (b) | No chloride used | 0.10 |

In these runs it appeared that hydrogen peroxide was being formed but was also decomposing rapidly, hence it would be possible to use these processes for an oxidation reaction, by having present a substance oxidisable by hydrogen peroxide.

*Example 6*

A hydrogen peroxide preparation was carried out at 60 atmospheres total pressure under the following conditions.

| | |
|---|---|
| Catalyst | Palladium (5%) on silica gel; 0.25 g. used. |
| Volume of reaction mixture | 25 ml. initially. |
| Liquid medium | 75% acetone, 25% water, by volume. |
| Sulphuric acid | $10^{-1}$ N. |
| Hydrochloric acid | $10^{-2}$ N. |
| Temperature | 0° C. |
| Gas composition | Hydrogen 4%, oxygen 4%, nitrogen 92%, by volume. |
| Sodium hexametaphosphate | 100 p.p.m. by weight. |

In 15 minutes' operation 0.49 g. of hydrogen peroxide was produced. By way of comparison a run was carried out in which however no sodium hexametaphosphate was used: in 15 minutes' operation only 0.25 g. of hydrogen peroxide was formed.

*Example 7*

A solution (20 ml.) of sodium pyrophosphate (200 p.p.m.) boric acid (N) and hydrochloric acid ($10^{-2}$ N) in a mixture of acetone 75% and water 25% (by volume) and having suspended in it 0.2 g. of a finely divided catalyst (silica gel supporting 5% by weight of palladium) was stirred vigorously in a glass-lined autoclave. Hydrogen and oxygen were pumped in to give a pressure of 50 atmospheres of each and stirring was continued for 30 minutes. After this time the pressure had fallen to 92 atmospheres. The solution then contained 0.52 g. of hydrogen peroxide.

The following example illustrates the use of the process of the invention in carrying out an organic oxidation process.

*Example 8.—Oxidation of cyclohexane using hydrogen peroxide produced in situ by the process of the invention*

(a) A mixture of hydrogen and oxygen (equal volumes) at atmospheric pressure was passed into the following reaction mixture vigorously stirred at 0° C.

| | |
|---|---|
| Cyclohexane | 5 ml. |
| Acetone 75% v./v.—Water 25% v./v. | 50 ml. |
| HCl | $10^{-2}$ N. |
| $H_2SO_4$ | $10^{-1}$ N. |
| $FeSO_4 \cdot 7H_2O$ | 0.25 g. |
| $Na_4O_2O_7$ | 10 mg. (≡200 p.p.m.). |
| Catalyst [1] | 1 g. |

[1] The catalyst was finely divided silica gel supporting 5% of its weight of metallic palladium.

After 4½ hours' operation the mixture contained 0.11 g. of cyclohexanol, 0.22 g. of cyclohexanone and 3.56 g. of unchanged cyclohexane. Thus substantially no cyclohexane was converted into other products. A small quantity of acetic acid was present, as the result of oxidation of the acetone.

The apparatus used for this run consisted of a low dead-volume reactor. This reactor was used with its gas exit port blocked: the hydrogen and oxygen were absorbed steadily as they were fed in, so that there was no need for recycling. The reaction mixture was kept in a state of foam by the vigorous stirring.

(b) The process of Example 1 was repeated using an acetone-water mixture containing 87.5% v./v. of acetone, 12.5% v./v. of water. After four hours' operation the reaction mixture contained 0.563 g. of cyclohexanol and 0.315 g. of cyclohexanone. Such side-reactions as took place were similar to those in Example 1.

I claim:

1. A process for producing hydrogen peroxide which comprises contacting a mixture of gases comprising oxygen and hydrogen with a solid catalyst having a metallic component selected from the group consisting of Group I and Group VIII of the Periodic Table and in the presence of a liquid containing water and a stabilizing and activating salt of a condensed phosphoric acid having a polymerization number up to about 14.

2. A process according to claim 1 wherein the said salt is soluble in the said liquid.

3. A process according to claim 1 wherein the concentration of the said salt is in the range of 20 to 200 p.p.m. by weight of the reaction mixture.

4. A process according to claim 1 wherein the acidity of the reaction liquid is in the range $10^{-4}$ N to N.

5. A process according to claim 4 wherein an acid is present in said liquid which is at least as strong as acetic acid.

6. A process according to claim 5 wherein the acid present is sulphuric acid.

7. A process according to claim 1 wherein a halogen including a pseudo-halogen ion is present.

8. A process according to claim 7 wherein the halogen ion is a chloride ion.

9. A process according to claim 1 wherein there is present in the said liquid at least one oxygen-containing organic compound selected from the group consisting of alcohols and ketones having a solubility in water of at least 1% by volume at room temperature.

10. A process according to claim 9 wherein the ketone is acetone.

11. A process according to claim 10 wherein acetone forms 30% to 95%, preferably 40% to 90%, of the liquid of the reaction mixture.

12. A process according to claim 1 wherein the solid catalyst consists essentially of palladium supported on silica gel.

13. A process according to claim 12 wherein the catalyst consists of 1% to 10% by weight of palladium supported on silica gel having a specific surface of 200 to 400 m.²/g.

References Cited

UNITED STATES PATENTS

| | | | |
|---|---|---|---|
| 1,108,752 | 8/1914 | Henkel et al. | 23—207 |
| 1,627,325 | 5/1927 | Halvorsen | 23—207 |
| 3,073,755 | 1/1963 | Banfield et al. | 23—207 |

FOREIGN PATENTS

| | | |
|---|---|---|
| 600,788 | 6/1960 | Canada. |
| 1,144,240 | 1/1963 | Germany. |

OSCAR R. VERTIZ, *Primary Examiner.*

MILTON WEISSMAN, *Examiner.*

H. S. MILLER, *Assistant Examiner.*